Dec. 28, 1965 M. FRIEDMAN ETAL 3,225,670

CAMERA APPARATUS

Filed Dec. 28, 1962 5 Sheets-Sheet 1

INVENTORS
Melvin Friedman
and
Milton S. Dietz

BY Brown and Mikulka

ATTORNEYS

CAMERA APPARATUS

Filed Dec. 28, 1962

INVENTORS
Melvin Friedman
and
Milton S. Dietz
BY
Brown and Mikulka
ATTORNEYS

Dec. 28, 1965 M. FRIEDMAN ETAL 3,225,670

CAMERA APPARATUS

Filed Dec. 28, 1962 5 Sheets-Sheet 3

INVENTORS
Melvin Friedman
and
Milton S. Dietz

BY
Brown and Mikulka

ATTORNEYS

INVENTORS
Melvin Friedman
and
Milton S. Dietz
BY
Brown and Mikulka
ATTORNEYS

Dec. 28, 1965 M. FRIEDMAN ETAL 3,225,670

CAMERA APPARATUS

Filed Dec. 28, 1962 5 Sheets-Sheet 5

INVENTORS
Melvin Friedman
and
Milton S. Dietz
BY
Brown and Mikulka
ATTORNEYS 3,225,670

CAMERA APPARATUS

Melvin Friedman, Watertown, and Milton S. Dietz, Lexington, Mass., assignors to Polaroid Corporation, Cambridge, Mass., a corporation of Delaware Filed Dec. 28, 1962, Ser. No. 248,092
14 Claims. (Cl. 95—13)

This invention relates to a novel camera of a miniature or so-called 35 mm. type embodying certain structural elements which cooperate to effect the loading, exposure, processing and removal of individual film assemblies or units used therein. The camera, in conjunction with the aforesaid film assemblies and a diffusion transfer method of image formation, is capable of producing finished photographic prints of high quality in the form of transparencies, and is especially adapted to the rapid production of transparencies of improved quality in full color.

The camera of the present invention is designed to accommodate film materials of a generally self-contained type for producing a finished photographic print. The film materials comprise a releasable processing liquid and are of a multilayer structure such that, after exposure and imbibition of the liquid into predetermined portions or layers, including at least a silver halide emulsion layer, as by the application of a compressive force to said film materials, an image is formed by the diffusion transfer of image-forming components to a proper image-receiving surface thereof. A suitable processing liquid may comprise an aqueous solution of a silver halide developer such as hydroquinone, a silver halide solvent of the type of sodium thiosulfate, and an alkaline substance such as sodium hydroxide. It may also preferably contain a thickening or film-forming agent such as a synthetic polymer of the type of sodium carboxymethyl cellulose to provide a desired viscosity. In producing a black-and-white image, a latent image is developed, the exposed silver halide is reduced to silver and the unreduced silver halide forms a soluble silver complex which is transferred from undeveloped areas, to the image-receiving surface, the image being formed on the latter in silver. In the production of a color transparency, substances capable of forming dye images at the image-receiving surface, such as dyes, color couplers, or the like, may be employed in the transfer process. Methods and film materials for producing black-and-white or multicolored images, of categories broadly related to those contemplated herein, are described in U.S. Patents Nos. 2,543,181; 2,614,926; 2,707,150; 2,968,554 and 2,983,606.

The camera of the invention is primarily intended to incorporate the rapid processing advantages of the Polaroid Land camera, sold by Polaroid Corporation of Cambridge, Massachusetts, U.S.A., in a flexible, compact, high-quality picture-taking instrument in the 35 mm. or small camera field, and particularly the small camera color field. An obvious advantage of a camera having such rapid processing properties resides in the fact that it eliminates the need for separate processing procedures and the delay of hours or one or more days usually attendant thereupon. A second advantage lies in the fact that the present camera enables the operator to see almost immediately the results of an exposure and to make whatever corrections are necessary, an especially helpful procedure in color photography. Inspection of the transparency through a magnifying viewer, which may be incorporated with the camera, indicates its degree of suitability for projection in such respects, as image definition, density, color, etc. Another advantage is to be found in the fact that each exposed and processed film assembly comes from the camera already mounted in a slide mount. Thus, no extra expense or time-consuming procedures are required for mounting the transparency for projection or for handling it safely for direct viewing.

In accordance with the foregoing considerations, a principal object of the invention is to provide a compact or miniature camera of the character described which, immediately following an exposure, is capable of delivering a completely processed photographic transparency, and, moreover, one suitably mounted for projection.

Other objects are to provide a camera of the aforesaid type which is adapted to produce a mounted transparency in full color; to provide a camera, as described, which is of simple design and easily operated; to provide a miniature self-processing camera adapted to accommodate a plurality of film units of the character described which are contained in, and individually released from, a film holder or magazine of a compact type mounted in the camera; to provide a magazine which, in conjunction with means of the camera, renders its contents releasable when mounted in the camera; to provide operational holding means for the camera in the form of a multipurpose pistol grip, the external surface of which serves as a means for conveniently and firmly holding the camera while making an exposure and the hollow interior of which constitutes a light-tight chamber in which the processing of each exposed film unit takes place prior to its removal from the camera; to provide a camera of the character described having manually controlled and automatic features relating to the efficient supplying, exposing, processing and movement of each of the film units; to provide an interlocking means between shutter tensioning means and elements controlling the advance of each film unit; to provide a film processing means particularly adapted to the characteristics of the camera and film assembly employed therewith; and to provide an associated viewing means for conveniently inspecting the completed transparencies.

Other objects of the invention will in part be obvious and will in part appear hereinafter.

The invention, accordingly, comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Whereas a conventional 35 mm. camera customarily employs roll film, the camera of the present invention, for special reasons peculiar to its structure and operation, is adapted to use with separate film assemblies, a plurality of which are in the general form of a film pack. Inasmuch as the film material of the present invention is of a sulf-processing type containing a processing liquid and is of a multilayer construction, it is inherently prone to be somewhat bulky in comparison to a conventional roll film. While this characteristic of bulk offers no particular difficulty where the camera is of a larger size than a miniature camera, because the capacity of the larger camera permits a supply of a self-processing roll film material to be somewhat loosely coiled therein, it does present a problem in conjunction with achieving the desired compactness of a 35 mm. camera. To satisfy the specification of a self-processing film and a camera of small dimensions, it has been found that individual film units are well adapted to the purpose. Furthermore, the objective of the present invention of providing the finished transparency in the form of a mounted slide is most readily accomplished by employing individual film units at the exposure and processing stages.

Figure 1:
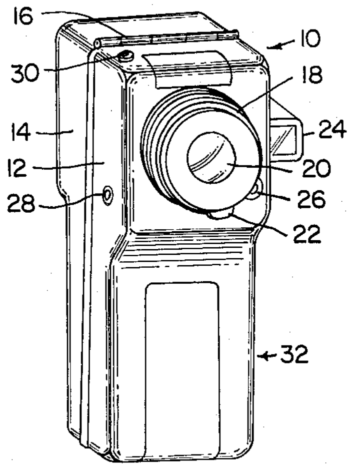
FIGURE 1 is an external perspective view of one embodiment of the camera of the invention.

Referring now to FIGURE 1, the camera 10 of the present invention is shown from the front, the visible components including a front housing section 12, a rear housing section 14, hinge means 16 pivotally connecting the housing sections, a lens- and diaphragm-mounting-and-adjusting means 18, a lens 20, a focus-adjusting knob 22, a finder means 24, a port or window 26 admitting light to a photocell, a shutter-tensioning and film-advance-controlling button 28, and a shutter-release button 30. The lower portions of the camera housing are appreciably narrowed, from front to rear, so as to constitute a modified form of pistol grip 32. The lens- and diaphragm-mounting-and-adjusting means 18, lens 20, focus-adjusting means 22, finder 24 and photocell means 26, namely, certain major components relating to the photographic exposure, may be considered as of any appropriate conventional type. Thus, for example, the lens may suitably be of an $f/1.9$ or $f/2.8$, 50 mm. type and the shutter of any between-the-lens or behind-the-lens design with speeds to $1/500$ or $1/1000$ second, although not limited to these $f$/numbers and speeds. The finder 24 includes suitable range- and view-finding means and, if desired, the optics of the camera may be of a so-called single lens reflex type. A counter mechanism, indicating the number of exposable film units remaining after each exposure, and a flashgun receptacle and internal structure relating to flash exposure, although not shown, are also to be considered as included. It will be understood that where a photocell-actuated control means is contained in a 35 mm. camera, it usually comprises a coupled exposure meter and is employed to automatically modify shutter speed, or vary the size of a diaphragm aperture, or both, in response to variations in the prevailing illumination. Although the present camera is not limited to the embodiment of a photocell and associated mechanism, it is to be regarded as functioning in one or more of the manners, above-described, if thus included. The terms "front" and "rear" as employed herein with respect to the position of elements or surfaces of both the camera and film assembly relate to the nearness or remoteness of said elements or surfaces to the front or lens of the camera.

Figure 2:
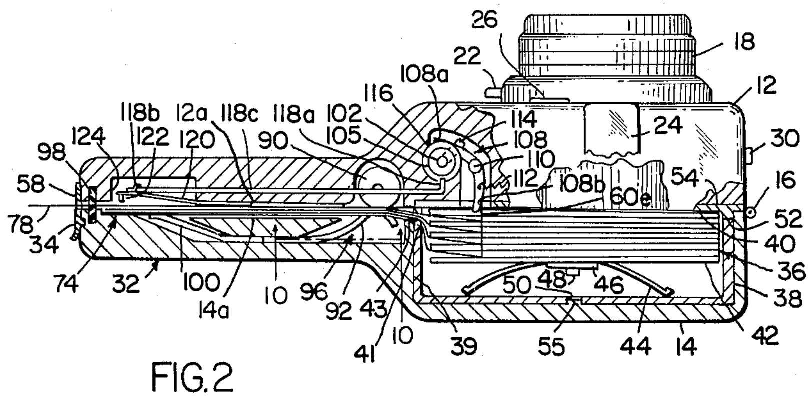
FIG. 2 is a diagrammatic side view of the camera, partly in cross-section and with portions broken away.
Figure 4:
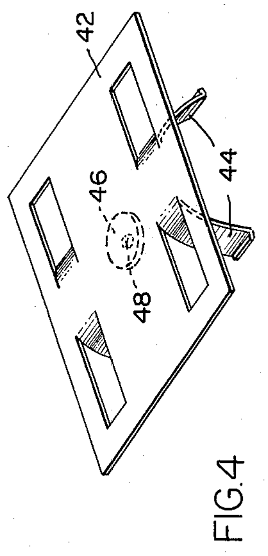
FIG. 4 is a diagrammatic perspective view of a pressure plate component of the magazine.
Figure 3:
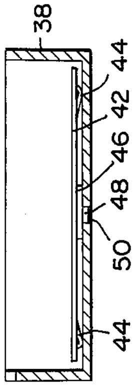
FIG. 3 is a diagrammatic side view in cross-section of the film magazine.

In FIG. 2, the camera 10 is shown with casing parts broken away to illustrate the novel structural features. The front and rear casing sections, 12 and 14, pivotally connected at 16, are releasably held at closed position by a latch 34. A plurality of film assemblies 36 is stacked in a magazine 38, the latter being mounted in an exposure chamber 39 formed in the rear casing portion 14 of the camera. The film assemblies or units are urged positively toward an exposure or focal plane 40 of the camera by a pressure plate 42 and an associated compression spring 44, the foremost film assembly being held flat at the focal plane and adapted, after its exposure, to withdrawal from the magazine sideways through a cut-away portion or exit slot 41 at one side of the magazine. Individual interleaves composed of a smooth optically clear plastic, although not shown, may be positioned between the film units to facilitate the slidable sideways movement of the front or foremost unit. The magazine 38, the pressure plate 42, and the spring 44 are shown in greater detail in FIGS. 3 and 4 and the magazine, with film materials mounted therein, is further illustrated in FIGS. 5 and 6.

On the rear side of pressure plate 42 is a spacer element such as a disk 46, having a rearwardly-disposed protuberance 48, e.g., a circular boss, which extends part way into, and is frictionally or compressively held by, an aperture 50 formed in the bottom of the magazine 38. As the magazine is initially supplied to the user, the boss 48 is held in the aperture 50, against the bias of spring 44, in a manner somewhat akin to that of a snap fastener. This is the condition shown in FIG. 3 and which may be assumed as existing in FIG. 5, prior to loading of the magazine into the camera. With the front and rear casing sections 12 and 14 swung to open position at hinge 16, the magazine is inserted into the exposure chamber 39 in the rear section 14 of the camera. When thus positioned and the camera sections 12 and 14 are closed and latched, the rearwardly-extending portions 52 of the front section, adjacent to the portions 54 of the front section which establish the focal plane 40 and frame each film unit for exposure, bear against the forward edges **38*a* of the magazine. A small projection or boss 55, extending forwardly from the rear wall of the chamber 39, is thereby brought into contact with the boss 48 of the pressure plate and forces the latter forwardly out of the magazine aperture 50. This permits the compression spring 44 and pressure plate 42 to assume control in biasing the film assemblies 36 toward the focal plane 40**.

Figure 5:
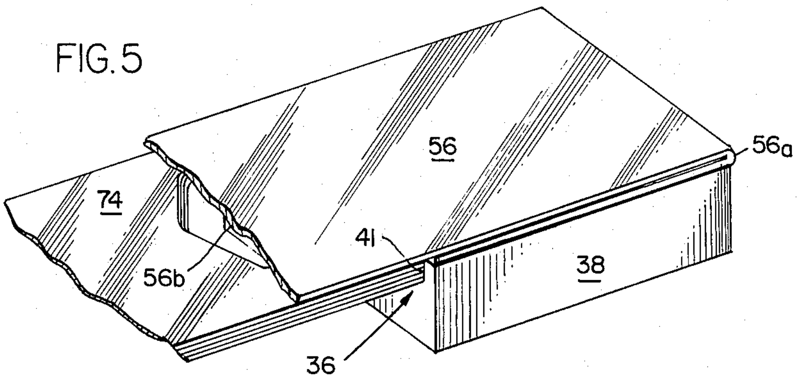
FIG. 5 is a diagrammatic perspective view of the film magazine, prior to its loading in the camera.

The magazine 38, fully loaded with film units 36, is shown in FIG. 5 as it would appear prior to its placement in the camera. An opaque cover sheet 56 such as a sheet of paper having an adequate tear resistance is releasably fastened to the edges **38*a* at the open face of the magazine, as by a pressure-sensitive or other appropriate adhesive. Sheet 56 is folded back, on itself at 56*a* and includes a leader portion, shown in part, only, at 56*b*. Alternatively the sheet 56 may be folded over the edge of the magazine and be releasably attached to the side of the magazine 38 farthest from the leader 56*b*. After the magazine has been inserted in the camera and the camera sections 12 and 14 brought together, the leader projects from the camera through the aperture 58. The extremity of the cover sheet leader may then be stripped or peeled from the magazine allowing the pressure plate 42 to perform, without restraint, its function with respect to the film units 36 of biasing them toward the focal plane 40. Other methods of releasably attaching the cover sheet 56 to the magazine 38** may be employed, such as heat sealing means to provide a hermetical seal, or a cover material comprising serrated or partially perforated portions along the edges may be used to facilitate stripping.

Figure 6:
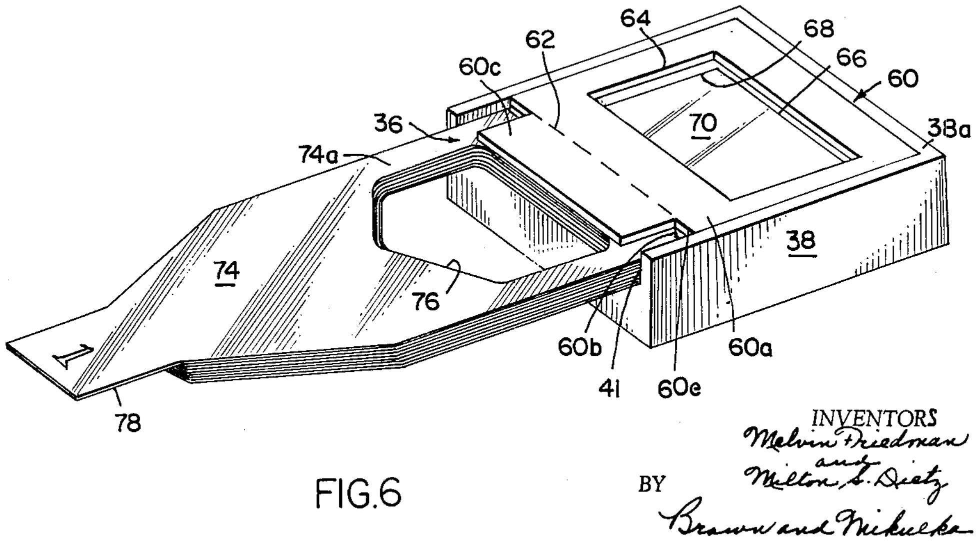
FIG. 6 is a perspective view of the magazine showing a plurality of films units contained therein.

The structure of a film unit or assembly 36 is shown in detail in FIGS. 6 through 9, namely, from a front or exposure direction in FIGS. 6, 7, 17 and 18, which would be the surface nearest the lens 20 of the camera when positioned therein as in FIG. 2, and from an opposite or rear direction in FIGS. 8, 9, 13 and 14. Referring to FIGS. 6, 7, 17 and 18, the film assembly 36 comprises a flat, substantially rigid frame-like mount 60 composed of a cardboard, a plastic, or other suitable material, and including a major front section *60a* and a minor rear section *60b*, the latter being superimposed with, and bonded to, the front section along three sides, exclusive of that of a flap or leaf portion *60c* of the front section. The flap *60c* is adapted to be hinged or pivoted 180° rearwardly against itself along the semi-perforations 62, this step having been completed in the showing of FIG. 7. The front section *60a* has a rectangular exposure aperture 64 formed therein, within which is a thin opaque masking element 66 composed, for example, of a metallic sheet material such as aluminum, or a metallized plastic, such as polyethylene terephthalate sold under the trade name of Mylar by E. I. du Pont de Nemours, Wilmington, Delaware, U.S.A., bonded in part to the rear surface of front section *60a*, and forming a second aperture 68 of slightly smaller dimensions within the aperture 64. The masking element 66 contributes to a sharply defined picture area, as explained below. The rectangular aperture 68 which is the functional exposure aperture may, for example, be considered as having the dimensions of the conventionally exposable area of a 24 x 35 mm. film, or it may have the dimensions of another film material used in a miniature camera. Assuming the 24 x 35 mm. miniature format of film, it is to be noted that the short or 24 mm. dimension of the aperture 68 is parallel to the direction of withdrawal of the film units from the focal plane, after an exposure. This presupposes that the camera is to be held vertically for horizontal picture taking. It is possible, however, to construct the film assembly so that the long dimension of aperture 68 is parallel to the direction of withdrawal, in which case the camera could be held horizontally to obtain a horizontal picture. A photosensitive film material 70 adapted to have an image formed therein, by a diffusion transfer method of the character above-described, is mounted adjacent to the front section as, for example, by having its edges inserted in nonbonded marginal areas or slots 72 between the front and rear sections and being held fixed therewithin by an adhesive. The film, thus mounted, is exposable through the aperture 68, the surface portion of the film, as seen in FIG. 6, being the transparent film base or support through which the silver halide emulsion layer of the film is exposed.

Each film unit also includes a separable leader 74, attached to rear section *60b* of the mount 60, preferably composed of an opaque paper, with an aperture 76 formed therein, the purpose of which is described below, and a draw tab 78 at its extremity. A number may be printed on the leader, or on the draw tab, as illustrated in FIG. 6 by the numeral "1" on the tab, to indicate the number of each unit positioned for exposure and, accordingly, the quantity of units remaining in the magazine, in place of the counter, previously mentioned.

Figure 8:
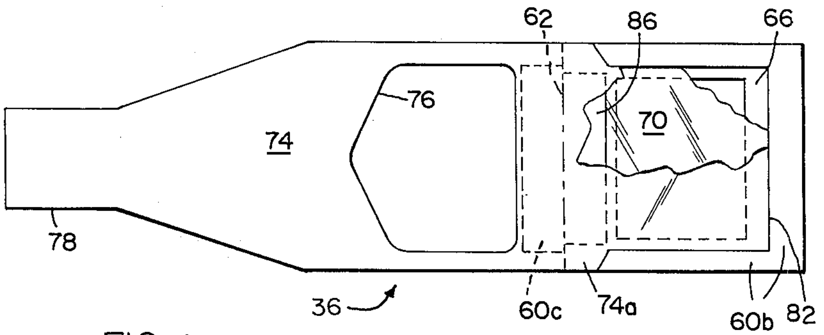
FIG. 8 is a diagrammatic rear view of a film unit.
Figure 7:
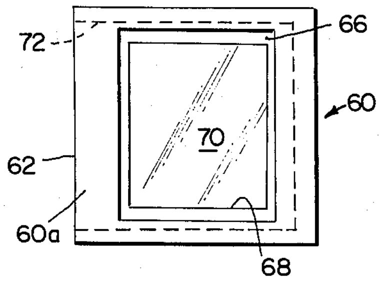
FIG. 7 is a diagrammatic front view of a film unit or assembly of the invention, with leader removed.

As shown in FIG. 8, the leader 74 is attached to the rear surface of the marginal areas of rear section *60b* at portions *74a*, preferably by a pressure-sensitive adhesive or other manually separable means. A cover sheet 82, also formed of an opaque paper, is superimposed with the rear or emulsion surface of the film material 70 in the area lying between the side and end members of the rear section *60b*. In a preferred structure, the cover sheet is integral with, and thus a trailing extension of, the leader 74, but it may be an individual and separate element, attached as noted below. The cover sheet serves both as a shield to prevent light from passing through the foremost film unit during its exposure when positioned in chamber 39, and, as a result, from reaching other unexposed film units in the magazine 38, and as a barrier sheet for spreading a processing liquid between the inner surface of said sheet and the emulsion of film material 70.

Cover sheet 82 is also preferably attached to the rear surface of front section *60a*, as by a pressure-sensitive adhesive at 84. A flexible, rupturable container 86 holding a liquid processing composition is attached to the inner surface of the cover sheet and is so positioned with respect to the film emulsion that its liquid content is released and spread over the emulsion when the film unit is progressively subjected to compression, thereafter being imbibed into the emulsion. The folded-over marginal portions 88 of the cover sheet constitute barrier or trapping elements to hold the processing liquid confined between the cover sheet and the film emulsion, thus contributing to the spreading of an even and complete layer of the liquid and preventing escape of any portion thereof from the film assembly into the camera mechanism.

A multilayer film material adapted to inclusion in a film assembly of the invention for producing a black-and-white transparency comprises, in order of light transmission of a photographic exposure, a transparent base layer, a transparent image-receiving layer, and a photosensitive silver halide emulsion layer, the latter being located adjacent to the cover sheet 82 with the liquid container 86 positioned therebetween. The emulsion and cover sheet are stripped from the unitary image-receiving and base layers after the exposure and processing steps.

Various color film structures lend themselves to incorporation with the film assemblies or units of the present invention. One such structure, adapted to a subtractive method of colored image formation, comprises, in order of incidence of the light of a photographic exposure, such as would occur in a direction toward the front surface of FIG. 7 or the uppermost film assembly in FIGS. 2 and 6, a transparent base layer, a transparent image-receiving layer, a blue-sensitive silver halide emulsion layer, a layer containing a yellow dye, a green-sensitive silver halide emulsion layer, a layer containing a magenta coupler, a red-sensitive silver halide emulsion layer, and a layer containing a cyan coupler, the latter being contiguous with the opaque cover sheet 82 and the liquid container 86. Assuming exposure to a multicolored subject and imbibition of the released processing liquid into at least the several emulsion layers, image-forming substances in substantially undeveloped areas of the photographically exposed blue-, green-, and red-sensitive emulsions are caused to diffuse to the image-receiving layer to provide, in the latter, registered color-separation images in yellow, magenta, and cyan, respectively. The several layers and cover sheet in bonded, unitary relation are stripped from the image-receiving layer, after completion of the processing step, leaving the latter layer, containing the multicolored image and integral with the transparent base layer, as a full-color transparency.

Another film construction suitable for inclusion in the film assembly of the invention, for producing a multicolored transparency by an additive synthesis, comprises, in order of reception of the light rays of a photographic exposure, a transparent base layer, an additive color screen layer composed, for example, of red, green and blue transparent screen components arranged geometrically or as an irregular mosaic, a transparent image-receiving layer, and a photosensitive silver halide emulsion layer which may, appropriately, be a panchromatic emulsion, the latter layer being contiguous with the cover sheet 82 and the liquid container 86. After completion of the exposure and processing steps, the emulsion layer and the cover sheet 82 are stripped, together, from the image-receiving layer. The multicolored transparency, comprising, in order, the base, color screen, and image-receiving layer, remains fixed in the mount 60.

Again referring to FIG. 2, after exposure of the foremost of the film units 36, which is positioned at the front of the magazine 38 at the focal plane 40, the exposed film unit is processed, removed from the camera, and the complete mounted print produced within a few seconds. The operations and mechanism for accomplishing these steps will now be described.

Figure 10:
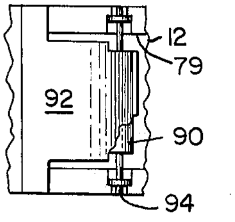
FIG. 10 is a diagrammatic rear view of pressure-applying means of the camera.

A pair of pressure-applying means, namely, a rotatable pressure roll 90 and a fixed but resilient pressure-applying member 92, having a bearing surface preferably of a similar radius of curvature to that of roll 90, are mounted immediately adjacent to a cut-away portion 43 forming an aperture in the wall of the exposure chamber 39, similar in depth to the exit aperture 41 of the magazine, for withdrawal of an exposed film unit from said exposure chamber. Pressure-applying means 92 and pressure roll 90 are shown in FIG. 10 from the rear, along the line 10—10 of FIG. 2. The pressure roll 90 is mounted for rotation in bearing means 94. It will be observed that the exit aperture 41 of the magazine is brought to a position contiguous with the chamber aperture 43 when the magazine is mounted in the camera thus providing a continuous passage for drawing each film unit therethrough after its exposure, the width of each aperture being slightly greater than the thickness of each film unit to accommodate the several leaders which extend therethrough, but of a width which permits only a single film unit to enter at one time.

Figure 12:
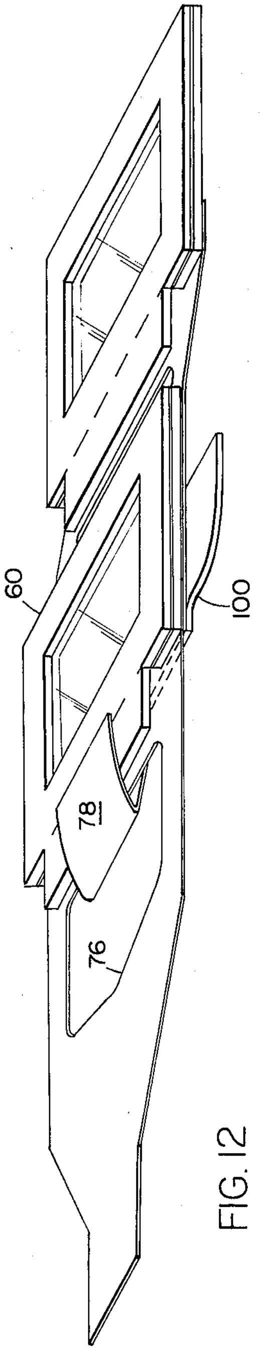
FIGS. 11, 12 and 13 are diagrammatic perspective views of the film units illustrating various positions thereof in the camera.
Figure 11:
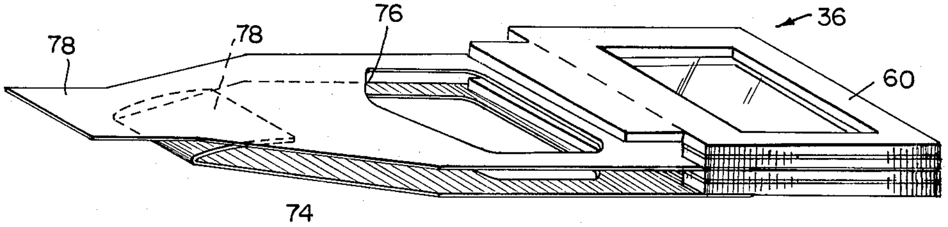

The leaders 74 are positioned, in superimposed relation, in a processing chamber 96 formed within the pistol grip 32 when the front and rear camera sections 12 and 14 are closed. As will be apparent, the loaded magazine can be mounted in only one position, namely, that in which the leaders 74 extend through apertures 41 and 43 into the chamber 96, between the platform elements 12*a* and 14*a* of the front and rear sections, respectively. The tab 78 of the foremost leader 74 extends through the aperture 58 and is in readiness to be grasped to withdraw the front film unit 74 from the exposure chamber after its exposure. The tab 78 of the first film unit may be assumed as having been brought to proper position, projecting through aperture 58, when the magazine 38 is loaded into the camera and the cover sheet 56 is removed. Alternatively, the tab may be folded over and lightly fastened, as by a weak adhesive, to the rear surface of the cover sheet and drawn to correct position during withdrawal of the cover sheet. A third method of positioning the tab of the initial film unit contemplates employing a leader for the cover sheet which is similar to that of the film units, namely, one having an aperture like the aperture 76, which operates in conjunction with the tab of a succeeding film unit in the manner described below. A resilient light-sealing means 98, composed of a sponge rubber, a plastic, a cloth material such as velvet, or the like, is positioned adjacent to the aperture 58 to prevent light from entering the processing chamber 96. The tab 78 of each succeeding film unit is initially folded or curved over in a clockwise direction onto the upper surface of its leader and under the surface of the preceding leader, as shown in FIG. 11. While the front or first film unit is being withdrawn in a linear movement from the exposure chamber 39 into the processing chamber 96, as provided by the guiding edges 79 of the latter chamber, the folded tab 78 of the second film unit, having a certain amount of resiliency, springs forward into the aperture 76 of the first unit, as shown in FIG. 12. A flat spring member 100 holds the leaders in a compact stack and also exerts a biasing force contributing to position the tab 78 of the second unit in the aperture 76 of the first or front unit. Upon continued withdrawal of the first unit, the tab 78 is contacted by the leading edge of the flap 60*c* and is caused thereby to flatten out and be drawn from the aperture 58, so as to be positioned for withdrawing the succeeding film unit, to which it is attached, after its predecessor has been entirely removed from the camera.

Figure 13:
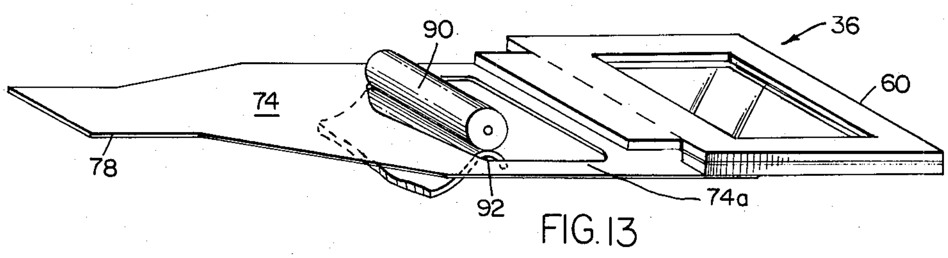

As illustrated in FIG. 13, the pressure-applying elements 90 and 92 lie within the aperture 76 of the leader between the transverse connecting strips 74*a* which, in part, form said aperture. This relation of the apertured structure of the film unit leaders and the pressure-applying means, the latter being, as noted, of a length less than the width of a leader, serves an important function in that it permits the pressure-applying elements to exert a compressive force according to the thickness dimension of each individual unit without bearing upon the leaders at all. This would not be the case if it were not for the apertures 76 of the leaders. In such an event, all of the leaders of the succeeding film units, one superimposed on another, would be positioned between the elements 90 and 92 at one time, and the combined thicknesses of all of the succeeding film unit leaders would be involved during each functional application of compression which would impair an exact control thereof. Accordingly, the aforesaid means for enabling the compressive elements to avoid contact with the film unit leaders contributes to a control of the applied pressure and a resulting proper thickness and evenness of spreading of the processing liquid when it is released from the container 86.

The pressure-applying means 90 and 92, being of a length slightly less than the transverse dimension of aperture 76 of the leader 74, so as to avoid contact with the leaders, as above explained, are also shorter in length than the dimension of the film mount 60, taken in a similar direction, that is, in a direction parallel with the long, or 35 millimeter, dimension of the exposure aperture 68. More paricularly, the length of the compressive means 90 and 92 is so chosen that compression is progressively applied from left to right with respect to a film unit, as shown in FIGS. 2 and 8, throughout the area of the processing-liquid container 86 and the area of the cover sheet 82. The cover sheet 82 is positioned between the side and end portions constituting rear section 60*b* of the film or slide mount, as shown in FIG. 8, so that the fixed pressure-applying member 92 slidably engages the cover sheet 82 within the boundary of said portions of section 60*b* during withdrawal of a film unit from the focal plane 40 for processing purposes. Thus, prior to the compression of the area of film 70, only the front section 60*a* of the film mount is that part of the mount which is drawn between the compressive members 90 and 92 and the full thickness of the slide mount is not encountered until after the film area, itself, is compressed, that is, where the end portions of front section 60*a* and rear section 60*b* overlie one another and are met at the end of the compressive cycle. This structure avoids an abrupt application of pressure at the beginning of the cycle. The masking element 66 insures sharp edges of the image area relative both to making the exposure and covering the exposed area adequately with the processing liquid. Inasmuch as the released processing liquid is spread over the film 70 on its rear surface beyond the limits of the actual exposure aperture, as determined by the length of the liquid container 86, the length of the compressive members 90 and 92 and the spacing between the rear section members 60*b*, the masking element 66 provides a margin of safety in the event that the liquid, for some reason, does not quite reach the limits established by the rear section members 60*b*.

Figure 15:
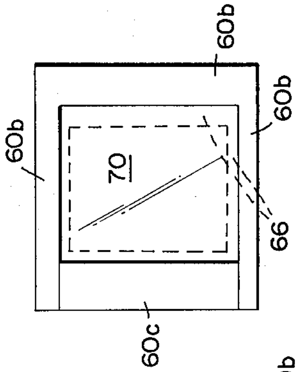
FIGS. 14 and 15 are diagrammatic rear views of the film unit, with leader removed.
Figure 14:
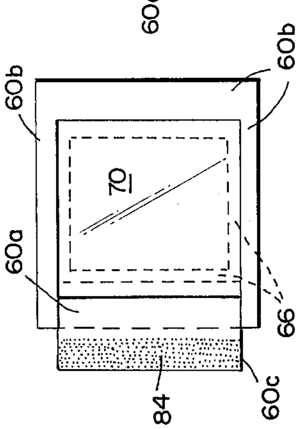

A photographically exposed and processed film assembly 36 is illustrated from the rear in FIGS. 14 and 15. In FIG. 14, it is to be assumed that the leader and waste film portions such as the emulsion layer or layers, made integral with the leader through bonding action of the processing liquid, have been stripped away after withdrawal of the assembly from the camera. The pressure sensitive adhesive 84 remains, at least in large measure, coated on the rear surface of the flap 60*c* of the front section 60*a*. In FIG. 15, the flap 60*c* has been folded over at 62 and held at this position by the adhesive 84 so as to become, in effect, a fourth frame member of the rear section surrounding the image-bearing film 70. To recapitulate, the complete mounted transparency is illustrated from the front in FIG. 7 and from the rear in FIG. 15. During advancement of a film unit, from the exposure chamber 39, through the processing chamber 96, to a location exteriorly of the camera, it will be noted that movement is in a single plane. This avoids any bending of the film mount 60 which might occur if said advancement were nonplanar, so as to dislodge the film element 70 mounted therein or cause a permanent deformation of the mount itself. As is well known, a curved or bent slide mount can impair the quality of the projected image during slide projection and can also interfere with the proper operation of the slide changer.

Figure 16:
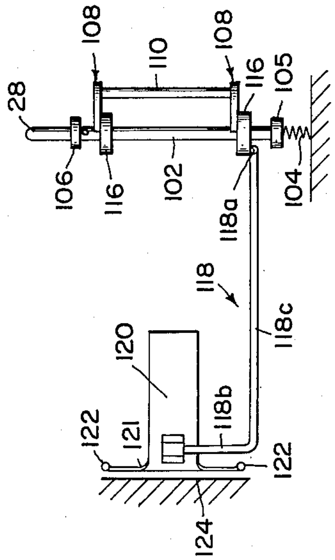
FIG. 16 is a schematic front view of mechanism controlling the proper positioning and advancement of the film units.
Figure 17:
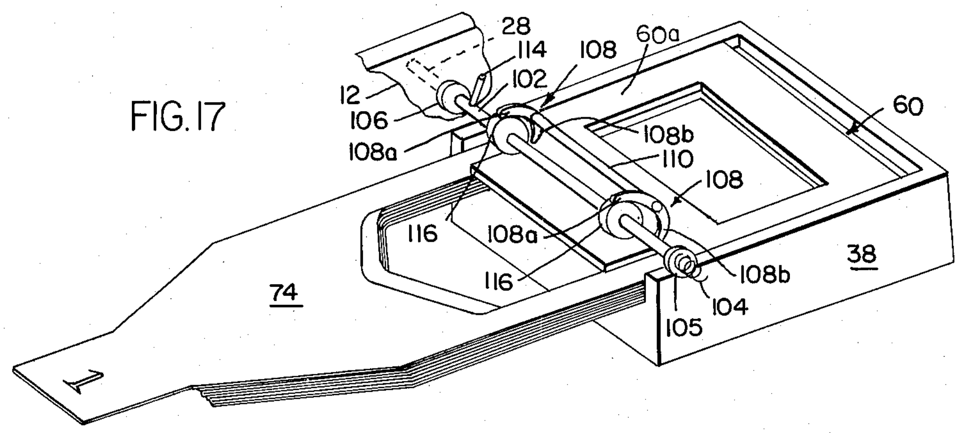
FIGS. 17 and 18 are diagrammatic perspective views further illustrating the mechanism of FIG. 16.

Means relating to the tensioning and release of the camera shutter and mechanism interlocking therewith for control of the removal of the film units 36 from the camera are shown in FIGS. 2, 16, 17 and 18. It is the function of the aforementioned mechanism to provide that the foremost film unit, after it has passed between the pressure applying means 90 and 92, shall be held against immediate withdrawal from the camera, namely, in the chamber 96 for a period sufficient to complete its processing. The actuating button or plunger 28 is actually the external portion or extremity, or a modified part, of a control shaft 102 which extends transversely through the front section 12 of the camera. The button 28 is used to tension the shutter, to indicate whether the shutter is under tension or not, and to indicate whether the film unit has undergone processing and is or is not ready for removal from the camera. The shaft 102 is slidably mounted in bearing means (not shown) of the front section for transverse or back-and-forth movement in the direction of its axis such that button 28 is either at an "in" position, as indicated in FIGS. 1, 2, 16 and 18, or at an "out" position, projecting outwardly from the casing of the front section, as illustrated in FIG. 17. The control shaft 102 is biased toward the "out" position by a compression spring 104, bearing against a mounting flange or cup 105 located at the end of shaft 102 opposite to that end occupied by button 28 and by fixed portions of front section 12.

The maximum travel of shaft 102 in the "out" direction is determined by a collar 106 which serves as a limit stop in conjunction with front section portions 12, with which it comes into contact.

Each of a pair of detent members 108, in the form of a bell crank, is pivotally mounted by shaft means 110 adjacent to the control shaft 102 and is so biased for rotation by spring means 112 that one arm **108*a* of each detent member is urged toward the control shaft, while the other arm 108*b* is urged toward the indented edge 60*e* of the film mount 60. For this purpose, the detent members 108 may be attached to shaft 110 and the latter mounted and biased for counterclockwise rotation, or each detent member 108 may be mounted for individual rotation thereon and separately biased in said direction of rotation. The projecting element 114, extending from the transverse shaft 102, is connected with shutter cocking or tensioning mechanism (not shown) in such a manner that when the button 28 is pushed inwardly, the camera shutter (not shown) is tensioned in readiness for making a photographic exposure. Element 114** may thus be considered as a fragmentary portion of a linking arm, stud, cable, etc., depending on the actual construction and the movement required of the shutter tensioning mechanism, the latter conventionally undergoing either a rotational or a linear movement for tensioning purposes.

A pair of drums 116 of small diameter is also mounted on the transversely movable control shaft 102. Drum elements 116 serve, with detent arms **108*a*, to hold the control shaft 102 at the "in" position when actuating button 28 is pressed inwardly against the bias exerted by compression spring 104. This is achieved through pivotal movement of the detent members 108 in a counterclockwise direction under the bias of spring 112, as illustrated, and engagement of the sides of the detent arms 108*a* with the side surfaces of drums 116. Once this engagement of the detent arms 108*a* with drums 116 is accomplished, button 28 may be released and the shaft 102 and button 28 will be retained by the drums at the "in" position against the applied bias of spring 104. This is the condition illustrated in FIGS. 2, 16 and 18. At this position of the control shaft 102, the drum 116, located nearest to the compression spring 104, will be noted as having been brought into contact with a forwardly-extending extremity 118*a* of the multi-angled rod-like connecting element 118. Element 118 is connected at an opposite and differently-angularly-extending extremity 118*b* to a resilient member 120, generally similar to a flat spring and attached to front section surface 12*a* at one end. Member 120 serves, through the medium of a second resilient cross-member 121, also of the form of a flat spring and attached at its mid-section to member 120, to mount a pair of transversely-spaced, rearwardly-extending pins 122. Members 120 and 121 will thus be noted as extending at 90° to one another and to have principal surfaces also relatively disposed at 90°. The pins 122, at their extreme rearward position, as biased by the spring-like property of member 120, engage the recessed portions 60*e* of each film unit when the film unit has been advanced to a position contiguous with the pins. They thus function to hold the film unit in the chamber 96 and prevent its removal during the processing period, that is, during imbibition of the processing liquid into the emulsion layers of the film assembly. When the pins 122 are moved forwardly, through movement of element 118*b*, as explained below, they are withdrawn from contact with the recessed edges 60*e* of the film mount and thus allow the film unit to be advanced through the exit aperture 58 of the camera until it is completely withdrawn from the camera. More exactly, during advancement of each film unit by pulling the leader, when the recessed edges 60*e* contact the pins 122, they carry the pins a short distance in the direction of said advancement by reason of the resiliency of the cross-member 121 which yields in response to said contact, namely, in a direction longitudinally of chamber 96 until the cross-member 121, which carries the pins, comes into contact with the fixed surface 124. At this position, the pins, and, accordingly, the film unit engaged thereby, are held fast against further movement until the pins are removed from the recessed edges 60*e*, as explained below. When the pins are thus removed, the cross-member 121 springs back to its normal position, shown in FIG. 16, carrying the withdrawn pins 122 forwardly of the portions 60*b*** of the film mount. The film unit is then free to be withdrawn completely from the camera.

As previously indicated, the pins 122 are normally biased rearwardly toward the film unit so as to contact the recessed portions **60*e* of the film mount when, during advancement of the film, said recessed portions are brought adjacent to the pins, the rearward bias being applied by the spring-like characteristic of the longitudinally-extending member 120. The thrust of the surface 116*a* of drum 116 against the connecting rod portion 118*a*, which extends forwardly in the camera, that is, in a direction normal to the plane of the paper and toward the viewer in FIG. 16, causes a pivotal movement of rod portion 118*a* and applies a torque to the intermediate connecting rod portion 118*c*, the last-named rod portion extending in a direction parallel to the plane of the paper. The applied torque, in turn, causes the connecting rod portion 118*b* to move pivotally in a direction generally toward the viewer in FIG. 16 and to raise spring member 120 in a similar direction, in opposition to its inherent bias. The foregoing operations, when considered with respect to the position of the detent pins 122 shown in FIG. 2, will be understood as having caused their forward movement to a position at which they would be out of contact with the recessed portions 60*e*** of the film mount.

Figure 18:
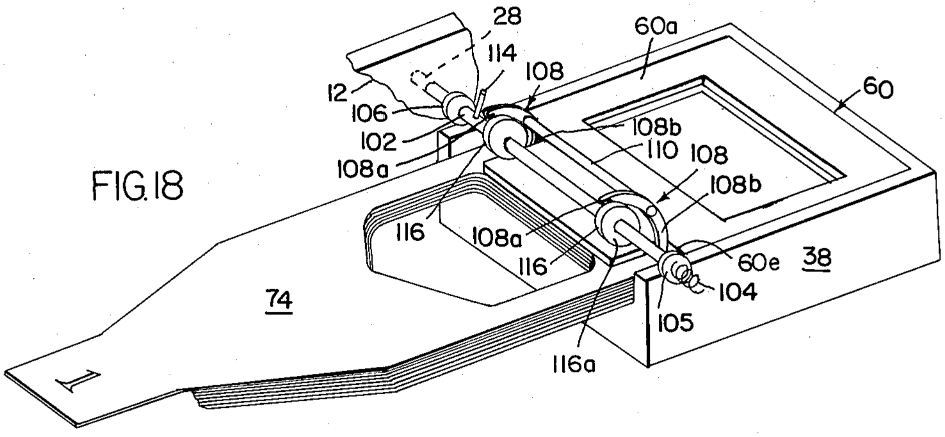
Figure 9:
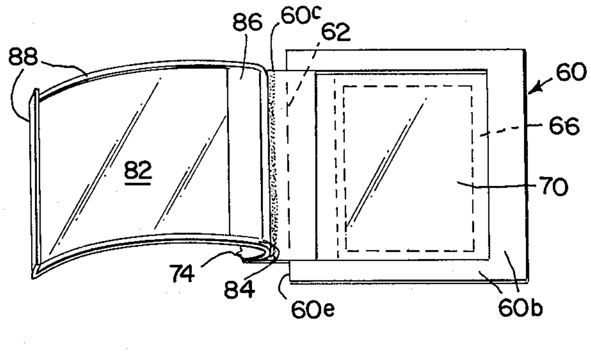
FIG. 9 is a diagrammatic rear view of a film unit, with leader removed.

The condition, illustrated in FIGS. 2, 16 and 18, is one in which the film materials and camera mechanism are in readiness for making a photographic exposure, the actuating button 28 having been pushed to the "in" position. The shutter has thereby been tensioned for performing an exposure through the medium of the connecting means 114. The foremost film unit 36 in the magazine 38 has been positioned properly for its exposure at the focal plane 40. The detent arms 108*a* hold the control shaft 102 and integral button 28 at the "in" position. The detent pins 122 are momentarily at non-engaging position with respect to the to-be-advanced film unit.

It will now be assumed that the foremost film unit has been exposed by pressing the shutter release button 30 and that the film unit is to undergo processing and removal from the camera, to be viewed as a finished and mounted slide. The tab 78 is manually pulled upon and, in response thereto, the leader 74 commences to draw the exposed mounted film from the focal plane through the passage provided by apertures 41 and 43 and between the pressure-applying means 90 and 92, whereat the processing liquid is released and spread between given layers of the film unit. The detent member 108 is caused to pivot in a clockwise direction, as illustrated in FIGS. 17 and 18, through contact of the moving recessed edges 60*e* with the detent arms 108*b*, the tips of the detent arms 108*b* being lifted onto the surface of the front section 60*a* of the film mount through contact of the advancing edges 60*e* therewith. Accordingly, the detent arms 108*a* are removed from contact with the sides of the drums 116. The control shaft 102 and actuating button 28 are thus released from being held at the "in" position and slide transversely, under thrust from the compression spring 104, so that button 28 assumes the "out" position. The detent arms then assume a position riding on the peripheries of the drums 116, as shown in FIG. 17, and remain at this location until the button 28 is again pushed to the "in" position. The drum 116 which had been bearing forcibly against the connecting rod 118*a* to cause its pivotal movement is drawn away therefrom. This removes the torque from the connecting rod 118 and permits the spring-like property of member 120 to assume control and move the detent pins 122 rearwardly to a position for intercepting the recessed edges 60*e*. The detent pins are thus positioned for holding the film unit stationary when the edges 60*e* of the latter reach a location contiguous with said pins. The film unit is allowed by the operator to remain in the processing chamber for the given few seconds necessary to complete the processing step, that is, to permit imbition of the processing liquid into the film materials and transfer of the image-forming substances. Release of the film unit to permit its removal from the camera is accomplished, as above described, by pressing the button 28 inwardly to withdraw the pins 122 from their holding function. Withdrawal of a given film unit from the camera automatically pulls the tab 78 of the next succeeding film unit out of aperture 58, for use, subsequently, in advancing said succeeding unit, as previously stated. Once removed from the camera, the leader and emulsion portions adhering thereto are stripped from the processed film unit; the rear surface of the film 70 lying between the mount portions 60*b* is treated with a coating solution for stability purposes, as may be necessary, and the flap 60*c* is folded over, as above described and shown in FIGS. 14 and 15, to produce the completed transparency.

Operation, in résumé, is as follows. Pressing the button 28 to the "in" position tensions the shutter and moves the detent pins 122 away from a position for engaging the recessed edges 60*e* of the film unit 36 when the latter is advanced adjacent thereto. The photographic exposure is made by pressing the shutter release button 30. The foremost film unit is then drawn from the exposure chamber by pulling on tab 78 which releases the control shaft 102, allows button 28 to assume the "out" position, under bias of compression spring 104, and, through the interconnection of element 118, permits the detent pins 122, under the bias of flat spring-like element 120, to assume a position for engaging the recessed edges 60*e* of the film unit. The film unit is drawn between the compressive members 90 and 92, releasing and spreading the processing liquid, as previously explained, and is advanced within the processing chamber 96 until it is stopped by contact of the aforesaid edges 60*e* with the pins 122. After the passage of the given number of seconds necessary for imbition of the processing liquid within the film unit and formation, by a diffusion transfer process, of the image therewithin, the button 28 is again pressed to the "in" position, releasing the pins 122 from their engaging position so as to permit the film unit to be completely withdrawn from the camera and again tensioning the shutter for the next exposure. The leader 74, with the adhering waste emulsion layers, is stripper from the image-receiving layer, the latter is coated with a stabilizing substance, as may be required, and the flap 60*c* of the film mount is folded over, in the manner previously described, to form the finished mount. The mounted transparency is then in completed form and is in readiness for use in conjunction with a slide projector or other viewing device.

Figure 19:
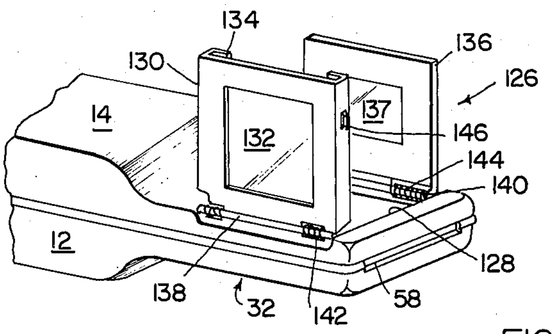
FIG. 19 and 20 are diagrammatic perspective views of means associated with the camera for viewing a completed photographic transparency.

FIG. 19 illustrates a viewing means 126 mounted on the camera for inspecting a magnified image of the transparency immediately after its completion, the magnification being essential to a proper check of the image because of the very small dimensions of the 24 x 36 mm. miniature format. The viewing device is permanently mounted for convenience on the pistol grip 32 in a recess 128 formed therein and comprises a slide holder 130, including a diffusing screen 132 and flange elements 134 for slidably engaging the rigid film mount 60, and a magnifying element or eye-piece 136 having a positive lens 137. Both of the components 130 and 136 pivot inwardly at hinges 138 and 140, against the bias provided by springs 142 and 144, respectively, and are releasably held at folded position by frictional contact of the projection 146 of the slide holder 130 with the side walls of the recess 128. The magnifying element 136 underlies the slide holder 130, at the folded-down position of both, the slide holder pivotal mounting means being located at a greater height above the piston grip surface than the pivotal mounting for element 136.

Figure 20:
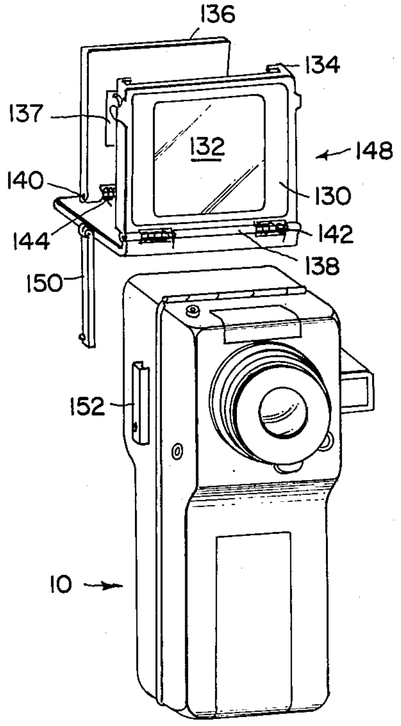

The viewing means 148 of FIG. 20 is generally similar to that of FIG. 19 excepting that it is in the form of an attachment which can be rapidly mounted or dismounted relative to the camera, as by means of folding post 150 and socket 152. Alternatively, the mounting means may be an adapter on the base of the viewer 148 which fits into a conventional flashgun socket (not shown) mounted on the camera.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A miniature camera for use with film units of a type including a photosensitive area, a substantially rigid slide mount surrounding said area, a processing liquid releasably contained next to said area, and a leader for manually advancing each film unit linearly to a location outside of said camera, said camera being adapated to produce a finished transparency, ready-mounted for projection, and consisting of housing means constituting a first chamber for supplying and exposing at a focal plane a plurality of said film units in succession, means forming a narrow exit passage at one end of said first chamber of a width adapted to permit the individual removal of exposed film units from said chamber, housing means constituting a second chamber in which each of said film units is processed when drawn thereinto through said passage from said first chamber, said last-named housing means being of reduced front-to-rear dimensions relative to said first-named housing means so as to provide thereby a readily-held grip for picture-taking purposes, means pivotally connecting said first- and last-named housing means, a pair of compressive members mounted in said second chamber immediately adjacent to said passage from said first chamber between the adjacent surfaces of which each film unit is drawn so as to be compressed for releasing and spreading said processing liquid therewithin, platform and guide means in said second chamber for supporting and guiding said leaders and film units, and means forming an exit aperture for said film units leading exteriorly of the camera in said second chamber at an end opposite to that of said passage, said focal plane, passage, adjacent surfaces of said compressive means, platform means, and exit aperture lying substantially in a single plane so as to avoid deformation of said substantially rigid slide mount and displacement of film materials mounted therein.

2. A miniature camera for use with film units of a type including a photosensitive area, a substantially rigid slide mount surrounding said area, a processing liquid releasably contained next to said area, and a leader for manually advancing each film unit, said camera being adapted to produce a finished transparency, ready-mounted for projection, and comprising a front housing section containing lens, shutter and diaphragm means of said camera and, in part, film advancing and processing means thereof, a rear housing section containing film supply means of said camera and, in part, film advancing and processing means thereof, pivotal and latch means connecting and releasably holding said sections together, housing means constituting a first chamber principally located in said rear section for supplying and exposing at a focal plane a plurality of said film units in succession, means forming a narrow exist passage at one end of said first chamber and extending between said front and rear sections through which a plurality of said leaders is adapted to be positioned and of a width for individual removal of exposed film units therefrom, housing means constituting a second chamber, areas of which are located in each of said sections and in which each of said film units is processed when drawn thereinto through said passage from said first chamber, a pair of compressive members mounted in said second chamber immediately adjacent to said passage from said first chamber between the adjacent surfaces of which each film unit is drawn so as to be compressed for releasing and spreading said processing liquid therewithin, one of said compressive members being a rotatable pressure roll mounted in said front section and the other being a resilient spring-like member having a radius of curvature approximating that of said pressure roll, platform means in said second chamber for supporting said leaders and film units, means forming an exit aperture for said film units leading exteriorly of the camera in said second chamber at an end opposite to that of said passage from said first chamber, and resilient light sealing means within said second chamber adjacent to said exit aperture providing a narrow gap through which said leaders and film units are advanced so as to prevent the entrance of light into said second chamber, said focal plane, passage, adjacent surfaces of said compressive members, platform, light sealing gap, and exit aperture lying substantially in a single plane so as to avoid deformation of said substantially rigid slide mount and displacement of film materials mounted therein, said compressive members being of a given length which is less than the transverse dimension of said film unit and so chosen with respect to said dimension and other structure of said film unit that certain portions of said film unit are bypassed during advancement of said film unit between said compressive members, thereby permitting a minimum spacing between said members during applications of compressive force and avoiding abrupt changes of said force.

3. A miniature camera for use with film units of a type including a photosensitive area, a substantially rigid slide mount surrounding said area, a processing liquid releasably contained next to said area, and a leader for manually advancing each film unit, said camera being adapted to produce a finished transparency, ready-mounted for projection, and comprising a front housing section containing lens, shutter and diaphragm means of said camera and, in part, film advancing and processing means thereof, a rear housing section containing film supply means of said camera and, in part, film advancing and processing means thereof, pivotal and latch means connecting and releasably holding said sections together, housing means constituting a first chamber principally located in said rear section for supplying and exposing at a focal plane a plurality of said film units in succession, means forming a narrow exit passage at one end of said first chamber and extending between said front and rear sections through which a plurality of said leaders is adapted to be positioned and of a width for individual removal of exposed film units therefrom, housing means constituting a second chamber, areas of which are located in each of said sections and in which each of said film units is processed when drawn thereinto through said passage from said first chamber, a pair of compressive means mounted in said second chamber immediately adjacent to said passage from said first chamber between the adjacent surfaces of which each film unit is drawn so as to be compressed for releasing and spreading said processing liquid therewithin, one of said compressive means being a rotatable pressure roll mounted in said front section and the other being a resilient spring-like member having a radius of curvature approximating that of said pressure roll, platform means in said second chamber for supporting said leaders and film units, means forming an exit aperture for said film units leading exteriorly of the camera in said second chamber at an end opposite to that of said passage from said first chamber, and resilient light sealing means within said second chamber adjacent to said exit aperture providing a narrow gap through which said leaders and film units are advanced so as to prevent the entrance of light into said second chamber, said focal plane, passage, adjacent surfaces of said compressive means, platform, light sealing gap, and exit aperture lying substantially in a single plane so as to avoid deformation of said substantially rigid slide mount and displacement of film materials mounted therein, the dimension of the housing portion containing said lens, shutter, diaphragm and first chamber, taken in a direction from the front to the rear of the camera, being greater than the dimension of the housing portion containing said second chamber, taken in a similar direction, the latter housing portion constituting a pistol grip of relatively reduced thickness for conveniently holding the camera while making a photographic exposure.

4. A camera, as defined in claim 3, wherein the dimensions of both said housing portions in a direction at 90° to said dimensions from the front to the rear of the camera, that is the dimensions between the sides thereof, are substantially identical.

5. A miniature camera for use with film units of a type including a photosensitive area, a substantially rigid slide mount surrounding said area, a processing liquid releasably contained next to said area, and a leader for manually advancing each film unit, said camera being adapted to produce a finished transparency, ready-mounted for projection, and comprising housing means constituting a first chamber for supplying and exposing at a focal plane a plurality of said film units in succession, means forming a narrow exit passage at one end of said first chamber adapted to accommodate a plurality of said leaders extending therethrough and to the individual removal of exposed film units from said chamber, housing means constituting a second chamber in which each of said film units is processed when drawn thereinto through said passage from said first chamber, an interlocking mechanism comprising shutter tensioning means, a positionable detent means located at said second chamber, and a single actuating means therefor, said mechanism, at one position of said actuating means, serving to tension the shutter and release said detent means so that said film unit can be removed from said second chamber after its processing, and, at a second position, serving to locate said detent means so as to engage said film unit when it is drawn adjacent thereto and hold it within said second chamber for processing, a pair of compressive members mounted in said second chamber immediately adjacent to said exit passage from said first chamber between the adjacent surfaces of which each film unit is drawn so as to be compressed for releasing and spreading said processing liquid therewithin, platform means in said second chamber for supporting said leaders and film units, means forming an exit aperture for said film units leading exteriorly of the camera in said second chamber at an end opposite to that of said passage, and resilient light sealing means within said second chamber adjacent to said exit aperture providing a narrow gap through which said leaders and film units are advanced so as to prevent the entrance of light into said second chamber.

6. A camera, as defined in claim 5, wherein said single actuating means of the interlocking mechanism comprises a control shaft extending substantially across the camera housing which is slidably movable along its axis, one end of said shaft being biased by a compression spring to provide slidable movement in a given direction and the other end extending through an aperture in the camera housing so as to constitute a manually actuable plunger which is adapted to be pressed inwardly, to provide slidable movement of said shaft in a direction opposite to that caused by said compression spring.

7. A camera, as defined in claim 6, wherein means of said control shaft, at an inward position of said plunger, is adapted to contact means interconnecting with said detent means of said second chamber to effect removal of said detent means from contact with a film unit located in said chamber to permit its removal therefrom.

8. A camera, as defined in claim 7, wherein said control shaft is connected with means for tensioning the camera shutter so as to provide tensioning of the shutter at the inward position of said plunger.

9. A camera, as defined in claim 7, wherein said control shaft comprises a pair of spaced circular drums for varying engagement with one arm of each of a pair of bell crank elements rotatably mounted adjacent to said control shaft and spring-biased in a direction for said engagement, the other arm of each of said pair of bell crank elements being thus biased to engage a leading edge of said slide mount, when the film unit is positioned for photographic exposure, and to be rotated and lifted onto the surface of said slide mount by said leading edge during its advancement from the exposure position.

10. A camera, as defined in claim 9, wherein said one arm of each pair of bell crank elements is adapted to contact the side surfaces of said drums and hold said control shaft at an inward position, when said plunger is pressed against the applied bias of said compression spring, and is adapted to ride on the peripheries of said drums when said other arm of each pair of bell crank elements is rotated and lifted onto the surface of said slide mount through advancement of the film unit.

11. A miniature camera for use with film units of a type including a photosensitive area, a substantially rigid slide mount surrounding said area, a processing liquid releasably contained next to said area, and a leader attached to said slide mount for manually advancing each film unit, said leader including a tab at its leading extremity and a cut-out area constituting a relatively large aperture adjacent to said slide mount, the tab of a foremost film unit extending exteriorly of the camera through said exit aperture and the tabs of succeeding film units being folded over on the front surface of their respective leaders, said camera being adatped to produce a finished transparency, ready-mounted for projection, and comprising housing means constituting a first chamber for supplying and exposing at a focal plane a plurality of said film units in succession, means forming a narrow exit passage at one end of said first chamber of a width adapted to accommodate a plurality of said leaders extending therethrough and to the individual removal of exposed film units from said chamber, housing means constituting a second chamber in which each of said film units is processed when drawn thereinto through said passage from said first chamber, a pair of compressive members mounted in said second chamber immediately adjacent to said passage from said first chamber between the adjacent compressive surfaces of which each film unit is drawn so as to be compressed for releasing and spreading said processing liquid therewithin, said compressive members having a length less than the width of said leader cut-out area so as to be out of contact with said leader when said cut-out area is being advanced and brought adjacent to said compressive members, platform and guide means in said second chamber for supporting and guiding said leaders and film units, means forming an exit aperture for said film units leading exteriorly of the camera in said second chamber at an end opposite to that of said passage, resilient light-sealing means within said second chamber adjacent to said exit aperture providing a narrow gap through which said leaders and film units are advanced so as to prevent the entrance of light into said second chamber, and a flat spring-like element positioned between said compressive members and light-sealing means in the direction of film unit advancement so as to apply a bias to the rear surfaces of said leaders which contributes to force each folded-over tab of a succeeding film unit into the cut-out area of the leader of a preceding film unit so that said tab is pulled with the leader of said preceding film unit from the camera in readiness for use in advancing said succeeding film unit after its exposure.

12. A miniature camera for use with a plurality of film units of a type including a photosensitive area, a substantially rigid slide mount surrounding said area, a processing liquid releasably contained next to said area, and a leader attached to said slide mount for manually advancing each film unit, said film units being contained in a magazine having a spring-biased pressure plate for urging said film units toward the front of the magazine, said pressure plate having a central plug-like fastener element projecting rearwardly therefrom which is releasably held in a central aperture constituting a socket extending through the rear wall of said magazine so as to hold said pressure plate contiguous with said rear wall of the magazine, said camera being adapted to produce a finished transparency, ready-mounted for projection, and comprising housing means constituting a first chamber for supplying and exposing at a focal plane a plurality of said film units in succession, said chamber having a centrally located projection extending forwardly from its rear wall which is adapted to enter said central aperture of the magazine and force said plug-like fastener element out of said aperture when the magazine is loaded in said first chamber, thereby releasing said pressure plate from its held position so as to apply pressure to said film units, means forming a narrow exit passage at one end of said first chamber of a width adapted to accommodate a plurality of said leaders extending therethrough and to the individual removal of exposed film units from said chamber, housing means constituting a second chamber in which each of said film units is processed when drawn thereinto through said passage from said first chamber, a pair of compressive members mounted in said second chamber immediately adjacent to said passage from said first chamber between the adjacent compressive surfaces of which each film unit is drawn so as to be compressed for releasing and spreading said processing liquid therewithin, platform means in said second chamber for supporting said leaders and film units, means forming an exit aperture for said film units leading exteriorly of the camera in said second chamber at an end opposite to that of said passage, and resilient light-sealing means within said second chamber adjacent to said exit aperture providing a tightly fitting gap through which said leaders and film units are advanced so as to prevent the entrance of light into said second chamber.

13. A miniature camera adapted to expose, process, and enable rapid exposure corrections of a plurality of film units so as to produce satisfactory finished transparencies of miniature dimensions, each transparency being thus produced mounted in a substantially rigid slide mount so as to be, essentially, in a suitable condition either for direct viewing or for projection immediately following removal from the camera, each said film unit including a photosensitive material, a releasably-contained processing liquid, a transparent medium for carrying the finished image, said slide mount, and a separable leader, said camera comprising a housing enclosing therewithin exposure and processing chambers with access means formed therebetween for permitting the individual movement of said film unit from one chamber to the other by drawing laterally upon said leader, compressive processing means contained in said processing chamber, guide means controlling the advancement of said film units within said camera chambers and through an exit aperture to a location exteriorly of said camera, and magnifying viewing means pivotally mounted in an exterior recessed area of said housing for accepting, after its passage through said exit aperture, each processed film unit from which its leader has been separated, said viewing means permitting the immediate inspection of each finished transparency for checking the need of exposure corrections and comprising, in order, a magnifying eyepiece, mounting means for said slide mount and a diffusing screen, which elements, in use, are pivoted to an upright optically aligned relation and, when not in use, are pivoted to a superimposed nested relation within said recessed area.

14. A miniature camera, as defined in claim 13, wherein that portion of said housing enclosing said processing chamber is of reduced dimensions relative to the portion enclosing said exposure chamber and wherein said recessed area mounting said viewing means is located within said housing portion of reduced dimensions.

References Cited by the Examiner

UNITED STATES PATENTS 2,854,903 10/1958 Land -------------- 92—12 X

JOHN M. HORAN, *Primary Examiner.*

NORTON ANSHER, *Examiner.*